(No Model.)

K. WIRTH.
APPARATUS FOR PLATE GLASS PICTURES.

No. 596,672. Patented Jan. 4, 1898.

Witnesses:

Inventor
Karl Wirth,
By Briesen & Knauth
his Attorneys

UNITED STATES PATENT OFFICE.

KARL WIRTH, OF NUREMBERG, GERMANY.

APPARATUS FOR PLATE-GLASS PICTURES.

SPECIFICATION forming part of Letters Patent No. 596,672, dated January 4, 1898.

Application filed December 17, 1896. Serial No. 616,025. (No model.)

*To all whom it may concern:*

Be it known that I, KARL WIRTH, a subject of the King of Bavaria, and a resident of Nuremberg, Bavaria, Germany, have invented certain new and useful Improvements in Display Apparatus, of which the following is a specification.

My invention relates to display apparatus, and has for its object to produce a device which will display pictures or other effects upon a looking-glass.

My invention will be understood by referring to the accompanying drawings, forming part hereof, in which—

Figure 1:
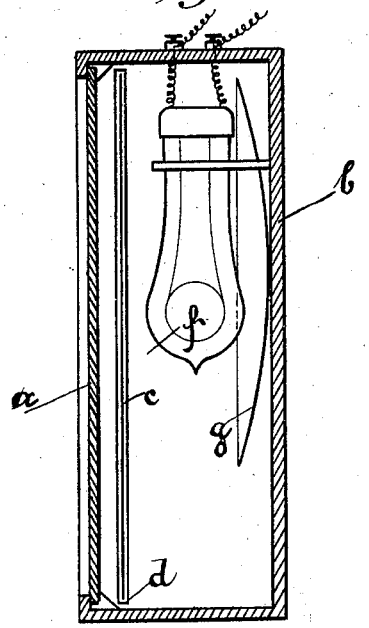
Figure 2:
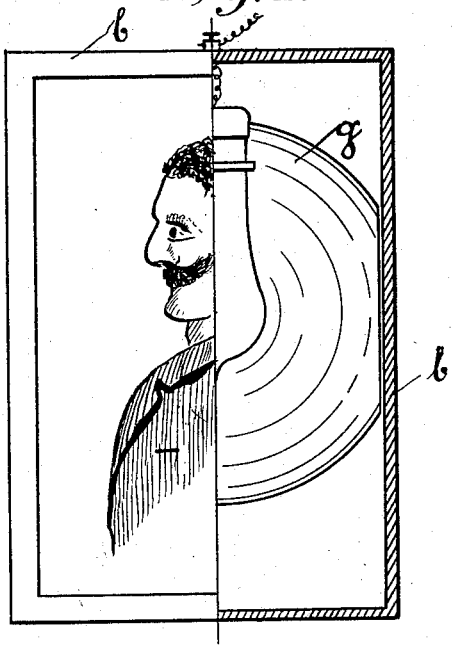
Figure 3:
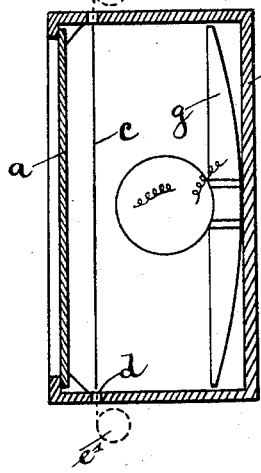
Figure 4:
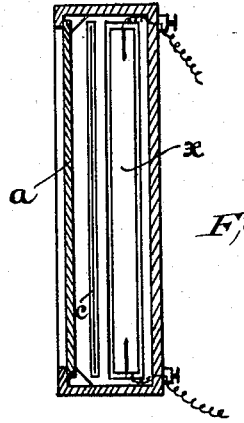

Figure 1 is a transverse vertical section through an apparatus embodying my invention. Fig. 2 is a front view of the same, partly broken away and in section. Fig. 3 is a section through Fig. 1 on line A B of the said figure, showing in dotted lines the pictures as mounted upon a roll. Fig. 4 is a sectional view of a modification wherein a Geissler tube is employed.

In the drawings, $b$ is a frame in which a mirror $a$ is mounted, the back of which mirror is thinly silvered, which silvering is painted with a transparent varnish or other transparent material instead of the customary dark-colored varnish. In the rear of this mirror is a picture $c$, which is translucent and is carried in slides $d$. In the rear of the picture is a suitably-supported lamp $f$, shown in the present instance as an electric lamp, behind which a concave mirror $g$ or other reflector is mounted.

When the lamp is lighted, the light thereof being reflected upon the picture will cause the same to appear in the mirror, and when the light is extinguished the picture will fade away.

In Fig. 3 the picture $c$ is shown in the form of a roll running on rollers $e$ $e'$.

In Fig. 4 instead of a lamp a Geissler tube is employed, which will serve the same purpose as the lamp.

The invention is principally designed to to be employed as an advertising device, but may be used for other purposes.

Current for the electrical devices may be supplied by any suitable apparatus.

What I claim, and desire to secure by Letters Patent, is—

1. In a display apparatus, the combination of a mirror having its rear face silvered to such a degree as to render the said mirror capable of reflecting objects, a picture mounted in the rear of the mirror and indistinguishable through the said mirror under normal conditions, and an electric light mounted in the rear of the picture and provided with means for lighting and extinguishing the same, whereby the picture may be exhibited in the mirror intermittently by intermittently flashing the light, substantially as described and for the purposes set forth.

2. In a display apparatus, the combination of a mirror having a silvered rear surface painted with a transparent substance, a source of light in operative proximity to the mirror, and a transparent picture or other effect interposed between the source of light and the mirror.

KARL WIRTH.

Witnesses:
JOHAN CHRISTOF BAUER,
HEINRICH FIETH.